(12) United States Patent
Kim et al.

(10) Patent No.: US 7,379,246 B2
(45) Date of Patent: May 27, 2008

(54) LIGHT-DIFFUSING FILM

(75) Inventors: Sang Pil Kim, Gumi (KR); Mun Bok Lee, Gumi (KR); In Sik Jung, Gumi (KR); Jun Sang Park, Gumi (KR)

(73) Assignee: Toray Saehan Inc., Kyungsangbuk-do (KR)

( * ) Notice: Subject to any disclaimer, the term of this patent is extended or adjusted under 35 U.S.C. 154(b) by 0 days.

(21) Appl. No.: 11/379,427

(22) Filed: Apr. 20, 2006

(65) Prior Publication Data

US 2007/0053064 A1 Mar. 8, 2007

(30) Foreign Application Priority Data

Sep. 5, 2005 (KR) .................. 10-2005-0082207

(51) Int. Cl.
G02B 13/20 (2006.01)
G02B 5/02 (2006.01)

(52) U.S. Cl. .................. 359/599; 359/613; 428/212

(58) Field of Classification Search ............ 359/599, 359/601–614, 707; 362/65, 112; 428/141–212
See application file for complete search history.

(56) References Cited

U.S. PATENT DOCUMENTS

| | | | |
|---|---|---|---|
| 5,620,775 A * | 4/1997 | LaPerre | 428/149 |
| 6,741,303 B1 * | 5/2004 | Okabe | 349/65 |
| 6,852,396 B1 * | 2/2005 | Mineo | 428/212 |
| 6,912,089 B2 * | 6/2005 | Nakagawa et al. | 359/599 |
| 7,072,115 B2 * | 7/2006 | Uekita et al. | 359/599 |
| 2005/0106377 A1 * | 5/2005 | Koestner et al. | 428/304.4 |
| 2005/0162743 A1 | 7/2005 | Shuuji et al. | |

FOREIGN PATENT DOCUMENTS

| | | |
|---|---|---|
| KR | 2004-7016125 | 11/2004 |
| KR | 1996-38912 | 1/2005 |

* cited by examiner

*Primary Examiner*—Thong Nguyen
(74) *Attorney, Agent, or Firm*—Bell, Boyd & Lloyd LLP

(57) ABSTRACT

Disclosed herein is a light-diffusing film for a backlight unit of a thin film transistor-liquid crystal display. Specifically, the current invention provides a light-diffusing film, including a transparent base sheet, a light-diffusing layer, which is laminated on any one surface of the base sheet and includes a light-diffusing resin and light-diffusing particles, and an antiblocking layer, which is laminated on the other surface of the base sheet and includes an antiblocking resin and antiblocking particles, in which the light-diffusing particles satisfy a predetermined relation between a specific surface area and a radius thereof. Accordingly, the light-diffusing film of the current invention can uniformly diffuse light transmitted from a light source lamp positioned at the side surface or back surface of a display device, thus realizing vivid and distinct display images.

7 Claims, 1 Drawing Sheet

LIGHT-DIFFUSING FILM

BACKGROUND

The present invention relates, generally, to a light-diffusing film for use in a backlight unit of a thin film transistor-liquid crystal display (TFT-LCD), and more particularly, to a light-diffusing film for displays, which uniformly diffuses light transmitted from a light source lamp positioned at the lateral side or the back surface of a display device, thus realizing vivid and distinct display images.

Recently, LCDs have been applied not only to monitors for notebook computers but also to large monitors for desktop computers and to TV monitors. Accordingly, a backlight unit for use in a light source of such an LCD is increasingly required to have a large size and high luminance.

In the backlight unit, a light-diffusing sheet functions to diffuse light of a light source from either a lateral side or the back surface of a display device to the entire display screen, and also convert it into light able to uniformly move forward through refraction. As such, a backlight process is an indirect lighting process for enhancing brightness of a display screen in a manner such that light originated from the light source of a backlight unit mounted to the back surface of a display device is transferred to the opposite side through a light guide plate and then reflected from a reflection plate, such as a metal deposition plate or an opaque white plate, to allow the light to move forward. Thus, the backlight process is a light emission technique capable of overcoming the problems of a conventional front-light process. As for the backlight process, when the number of light sources of a backlight unit is increased to realize high image brightness, power consumption and heat generation rate are increased. However, maximum light efficiency should be realized using minimum power consumption. In this regard, techniques for transferring light from a light source to a liquid crystal operator using a light-diffusing sheet comprising a base sheet and a light-diffusing layer formed on at least one surface thereof are receiving attention. Accordingly, the light-diffusing sheet requires an efficient design of the light-diffusing layer formed on the base sheet and improvement of the functions thereof depending on such a design.

For instance, Korean Patent Application No. 2004-7016125 discloses a light-diffusing film comprising a transparent film and a light-diffusing layer as a resin film layer having fine surface roughness formed on at least one surface of the transparent film, in which the transparent film includes a thermoplastic resin having a substituted and/or unsubstituted imido group at a side chain thereof, and a thermoplastic resin having a substituted and/or unsubstituted phenyl group and nitrile group. In addition, Korean Patent Application No. 1996-38912 discloses a method of forming a transparent resin layer including organic particles on a transparent plastic sheet for high light efficiency and luminance improvement.

However, such conventional techniques suffer because they have difficulty in actually realizing high luminance and shielding of LCDs, that is, improved total light transmittance and high haze, through only the variation in a combination of the types of the resin and the sizes of the particles applicable in the light-diffusing layer.

SUMMARY

An object of the present disclosure is to provide a light-diffusing film for TFT-LCDs, which has high light transmittance and haze.

In order to accomplish the above object, the present invention provides a light-diffusing film, comprising a transparent base sheet; a light-diffusing layer, which is laminated on one surface of the base sheet and includes a light-diffusing resin and light-diffusing particles; and an antiblocking layer, which is laminated on the other surface of the base sheet and includes an antiblocking resin and antiblocking particles, wherein the light-diffusing particles satisfy Relation 1 below:

$$A > 3/r \qquad \text{Relation 1}$$

wherein A is a specific surface area of a light-diffusing particle and r is a radius of a light-diffusing particle, in which the specific surface area indicates a surface area per unit volume and the light-diffusing particle has a volume represented by $(4\pi r^3)/3$ and an area represented by $4\pi r^2$.

In the light-diffusing film, the light-diffusing resin or antiblocking resin is preferably a thermosetting resin.

The light-diffusing particles or antiblocking particles are preferably formed of at least one resin selected from the group consisting of acryl, polyurethane, polyvinyl chloride, polystyrene, polyacrylonitrile, polyamide, and polymethylmethacrylate. The light-diffusing particles or antiblocking particles preferably have a diameter of 0.1~100 μm.

Further, the light-diffusing particles are preferably mixed in an amount of 0.1~1000 parts by weight based on 100 parts by weight of polymer in the light-diffusing resin, and the antiblocking particles are preferably mixed in an amount of 0.01~500 parts by weight based on 100 parts by weight of polymer in the antiblocking resin.

In addition, the light-diffusing layer is preferably 0.2~500 μm thick, and the antiblocking layer is preferably 0.1~100 μm thick.

Additional features and advantages are described herein, and will be apparent from, the following Detailed Description and the FIGURE.

DETAILED DESCRIPTION

Figure 1:
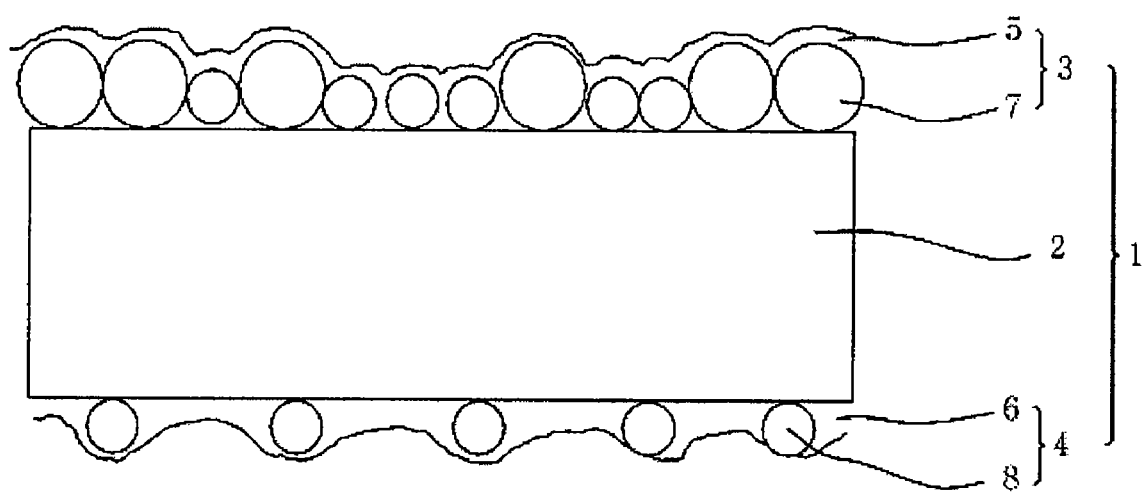
FIG. 1 is a cross-sectional view schematically showing a light-diffusing film having particles, according to the present invention.

Hereinafter, a detailed description will be given of the present invention, with reference to the appended drawing.

FIG. 1 illustrates a light-diffusing film 1 of the present invention, which comprises a transparent base sheet 2, a light-diffusing layer 3 including a light-diffusing resin 5 and light-diffusing particles 7 laminated on one surface of the base sheet 2, and an antiblocking layer 4 including an antiblocking resin 6 and antiblocking particles 8 laminated on the other surface of the base sheet 2, in which the light-diffusing particles 7 satisfy the Relation 1.

The thickness of the base sheet 2 is not particularly limited but is preferably 10~500 μm, more preferably 75~250 μm. If the base sheet 2 is thinner than 10 μm, it may be easily curled by the resin composition constituting the light-diffusing layer 3. On the other hand, if the base sheet 2 is thicker than 500 μm, luminance of an LCD is decreased and the backlight unit becomes so thick as to be unsuitable for use in manufacturing a slim LCD.

In the present invention, the light-diffusing layer 3, included of the light-diffusing resin 5 and the light-diffusing particles 7, is provided on any one surface of the light-diffusing film 1.

The light-diffusing film of the present invention is characterized in that high haze and high luminance can be realized when the light-diffusing particles included in the light-diffusing layer, which are formed in a spherical or non-spherical shape, satisfy Relation 1 below:

$$A > 3/r \quad \text{Relation 1}$$

wherein A is a specific surface area (surface area per unit volume) of a light-diffusing particle, and r is a radius of a light-diffusing particle.

Typically, a light-diffusing film comprises spherical particles having a diameter of 0. 1q00 rim, in which a specific surface area indicates a surface area per unit volume, and the spherical light-diffusing particle has a volume represented by $(4\pi r^3)/3$ and an area represented by $4\pi r^2$. If A is equal to or smaller than 3r, total light transmittance and haze are decreased, thus reducing luminance.

In the light-diffusing layer 3, composed of the light-diffusing resin 5 and the light-diffusing particles 7 dispersed in the resin 5, as the light-diffusing resin 5, any resin may be used as long as it is a curable type. Preferably a thermosetting resin, which is easily handled and available, may be used. Examples of the thermosetting resin include, but are not limited to, urea resin, melamine resin, phenol resin, epoxy resin, unsaturated polyester resin, alkyd resin, urethane resin, acryl resin, polyurethane, fluorine resin, silicon resin, and polyamideimide. Moreover, the resin should be preferably colorless and transparent, since light should be transmitted therethrough. In addition to the light-diffusing resin, a plasticizer, a stabilizer, a deterioration preventing agent, a dispersant, an antifoamer, or a foaming agent may be further added, if necessary.

The light-diffusing particles 7 used in the light-diffusing layer 3 are formed of at least one selected from the group consisting of acryl resin, polyurethane, polyvinyl chloride, polystyrene, polyacrylonitrile, polyamide, and polymethylmethacrylate. Also, spherical or non-spherical particles may be used. Preferably, the light-diffusing particles should be colorless and transparent such that a maximum amount of light is transmitted through the light-diffusing sheet.

The light-diffusing particles have a diameter of 0.1~100 μm, preferably 1~50 μm. If the particles are smaller than 0.1 μm, light-diffusing effects are insignificant. On the other hand, if the particles are larger than 100 μm, the resin composition constituting the light-diffusing layer is difficult to apply, and also the light-diffusing particles may be detached from the laminated light-diffusing layer.

In order to manufacture a light-diffusing sheet having total light transmittance of 85~95% through the control of optical properties of the light-diffusing layer 3, the ratio of light-diffusing resin 5 and light-diffusing particles 7 should be appropriately adjusted. That is, the light-diffusing layer 3 preferably includes 100 parts by weight of polymer in the light-diffusing resin 5 and 0.1~1000 parts by weight, preferably 10~500 parts by weight of the light-diffusing particles 7. If the amount of light-diffusing particles 7 is smaller than 0.1 parts by weight, light-diffusing effects are decreased. On the other hand, if the above amount exceeds 1000 parts by weight, it is difficult to apply the light-diffusing resin composition constituting the light-diffusing layer.

In the light-diffusing film 1 of the present invention, the thickness of the light-diffusing layer 3 to be applied is controlled, thereby adjusting the light transmittance. Particularly, with the aim of manufacturing a light-diffusing sheet having total light transmittance of 85~95%, the applied light-diffusing layer 3 should be preferably 0.2~500 μm thick, more preferably 2~200 μm. If the applied layer is thinner than 0.2 μm, adhesive strength to the film is decreased upon application and also the particles may be detached from the laminated layer. On the other hand, if the applied layer is thicker than 500 μm, the total light transmittance is not higher than 84%, and thus, a desired light-diffusing sheet cannot be manufactured.

Further, the light-diffusing film 1 of the present invention includes the antiblocking layer 4 consisting of the antiblocking resin 6 and the antiblocking particles 8.

The antiblocking resin 6 used in the antiblocking layer 4 preferably includes the thermosetting resin same as the light-diffusing resin 5, which is exemplified by any one selected from the group consisting of urea resin, melamine resin, phenol resin, epoxy resin, unsaturated polyester resin, alkyd resin, urethane resin, acryl resin, polyurethane, fluorine resin, silicon resin, and polyamideimide. The antiblocking resin 6 should be colorless and transparent since light should be transmitted therethrough.

In addition, a plasticizer, a stabilizer, a deterioration preventing agent, a dispersant, an antifoamer, a foaming agent or a waxing agent may be further added.

Further, the antiblocking particles 8 used in the antiblocking layer 4, which are the same as the light-diffusing particles 7, are formed of any one selected from the group consisting of acryl resin, polyurethane, polyvinyl chloride, polystyrene, polyacrylonitrile, polyamide, and polymethylmethacrylate. The antiblocking particles 8 are preferably spherical. As well, the antiblocking particles 8 should be preferably colorless and transparent to maximize the amount of light to be transmitted through the light-diffusing sheet, and have a diameter of 0.1~100 μm, preferably 1~50 μm. If the antiblocking particles 8 are smaller than 0.1 μm, a blocking phenomenon, which inhibits the film from traveling, may occur during the process. On the other hand, if the antiblocking particles are larger than 100 μm, the antiblocking resin composition constituting the antiblocking layer is difficult to apply, and also the particles may become detached from the laminated antiblocking layer.

The antiblocking layer 4 includes 100 parts by weight of polymer in the antiblocking resin 6 and 0.01~500 parts by weight, preferably 0.1~100 parts by weight, of the antiblocking particles 8. If the amount of antiblocking particles 8 is smaller than 0.01 parts by weight, a blocking phenomenon, which inhibits the film from traveling, may occur during the process. On the other hand, if the above amount exceeds 500 parts by weight, it is difficult to apply the resin composition constituting the antiblocking layer 4.

With the intention of assuring high light transmittance and antiblocking function and of obtaining a total light transmittance of 85~95%, the thickness of the applied antiblocking layer 4 is controlled to 0.1~100 μm, preferably 1~50 μm. If the antiblocking layer 4 is thinner than 0.1 μm, adhesive strength to the base sheet is decreased upon application and also the particles may be detached from the laminated layer. On the other hand, if the layer is thicker than 100 μm, the total light transmittance is decreased to 84% or less, and thus a desired light-diffusing sheet cannot be manufactured.

A better understanding of the present invention may be obtained in light of the following examples, which are set forth to illustrate, but are not to be construed to limit the present invention.

EXAMPLE 1

Step 1: Formation of Light-Diffusing Layer

A light-diffusing layer composition, comprising constituents shown in Table 1 below, was applied on one surface of a highly transparent polyester film (XG533-100 um, Toray Saehan Inc.) as a base sheet and was then dried at 110° C. for 60 sec, to form a 30 μm thick light-diffusing layer.

TABLE 1

| Composition | Kind | Amount (g) |
|---|---|---|
| Resin | A-811 (Aekyung Chemical Co. Ltd.) | 30 |
| Particles | PMMA (specific surface area 0.9) | 30 |
| Solvent | MEK | 40 |
| Total Amount | | 100 |

Step 2: Formation of Antiblocking Layer

An antiblocking layer composition, comprising constituents shown in Table 2 below, was applied on the other surface of the base sheet having the light-diffusing layer prepared in Step 1 and was then dried at 110° C. for 40 sec, to form a 5 μm thick antiblocking layer, thus manufacturing a final light-diffusing film.

TABLE 2

| Composition | Kind | Amount (g) |
|---|---|---|
| Resin | A-811 (Aekyung Chemical Co. Ltd.) | 28 |
| Particles | PMMA (specific surface area 0.9) | 0.5 |
| Solvent | MEK | 70 |
| Antistatic Agent | Anionic Antistatic Agent | 1.5 |
| Total Amount | | 100 |

COMPARATIVE EXAMPLE 1

A light-diffusing film was manufactured in the same manner in Example 1, with the exception that the light-diffusing particles were formed of SOKEN MX1000 (specific surface area 0.6) instead of PMMA used in Step 1 of Example 1.

The properties of the light-diffusing films manufactured in Example 1 and Comparative Example 1 were then analyzed as follows. The results are given in Table 3 below.

1. Measurement of Total Light Transmittance and Haze

The light transmittance and diffusibility of each of the light-diffusing films manufactured in Example 1 and Comparative Example 1 were assayed according to the following procedures. While light of 550 nm was transmitted perpendicular to a 10 cm×10 cm sized light-diffusing film sample which had been stood upright, the amount of light was measured using an automatic digital hazemeter available from Nippon Denshoku Industries Co., Ltd. The haze and total light transmittance were calculated from Equation 1 below:

$$Haze\ (\%) = (1 - P/TT) * 100$$

$$Total\ Light\ Transmittance\ (\%) = (TT/IT) * 100 \qquad Equation\ 1$$

wherein P is an amount of straight light, TT is a totally transmitted amount of light and IT is an amount of incident light.

2. Measurement of Luminance

Luminance of each of the light-diffusing films manufactured in Example 1 and Comparative Example 1 was measured according to the following procedures. A light-diffusing film sample was cut and mounted on a light-diffusing plate of a 32" direct type backlight unit. Then, a BM-7, as a luminance meter available from Topcon Corporation, was provided such that a measurement angle was set to 0.2° and an interval between the backlight unit and the BM-7 was set to 25 cm, after which luminance was measured at 13 positions on lamps of the backlight unit and 12 positions between the lamps and then averaged.

TABLE 3

| | Total Light Transmittance (%) | Haze (%) | Luminance (cd/m$^2$) |
|---|---|---|---|
| Ex. 1 | 91 | 87 | 4600 |
| C. Ex. 1 | 86 | 83 | 3500 |

As is apparent from Table 3, the light-diffusing film of Example 1, including the particles having specific surface area of 0.9 satisfying Relation 1, had higher luminance than the light-diffusing film of Comparative Example 1, including the particles having specific surface area of 0.6 unsatisfying Relation 1.

As mentioned above, the present invention provides a light-diffusing film, which is excellent in terms of total light transmittance, light diffusibility and luminance. Therefore, the light-diffusing film of the present invention can be used as optical material for improving light efficiency of a backlight unit of a TFT-LCD and is thus regarded as a very useful invention in the field of the chemical industry.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention to be claimed is:

1. A light-diffusing film, consisting of:
   a transparent base sheet;
   a light-diffusing layer, which is laminated on a surface of the base sheet and includes a light-diffusing resin and light-diffusing particles that satisfy the relation A >3/r, where A is a specific surface area of a light-diffusing particle and r is a radius of a light-diffusing particle; and
   an antiblocking layer, which is laminated on the other surface of the base sheet and includes an antiblocking resin and antiblocking particles,
   wherein said light-diffusing particles or antiblocking particles are formed of at least one resin selected from the group consisting of acryl, polyurethane, polyvinyl chloride, polystyrene, polyacrylonitrile, polyamide, and polymethylmethacrylate, and said light-diffusing particles or antiblocking particles have a diameter ranging from 0.1 to 100 km.

2. The light-diffusing film as set forth in claim 1, wherein the light-diffusing particles are mixed in an amount of 0.1~1000 parts by weight based on 100 μparts by weight of polymer in the light-diffusing resin.

3. The light-diffusing film as set forth in claim 1, wherein the light-diffusing layer is 0.2~500 μm thick.

4. The light-diffusing film as set forth in claim 1, wherein the antiblocking particles are mixed in an amount of 0.01~500 parts by weight based on 100 parts by weight of polymer in the antiblocking resin.

5. The light-diffusing film as set forth in claim 1, wherein the antiblocking layer is 0.1~100 μm thick.

6. The light-diffusing film as set forth in claim 1, wherein the light-diffusing particles and antiblocking particles are formed of at least one resin selected from the group consisting of acryl, polyurethane, polyvinyl chloride, polystyrene, polyacrylonitrile, polyamide, and polymethylmethacrylate.

7. The light-diffusing film as set forth in claim 1, wherein the specific surface area of the light-diffusing particle is a total surface area of the light-diffusing particle divided by the volume of the light-diffusing particle.

* * * * *